FIG.-1

April 21, 1970 J. S. KAMBORIAN 3,506,992
MECHANISM FOR PREPARING A SHOE ASSEMBLY FOR END WIPING
Filed May 17, 1968 9 Sheets-Sheet 2

April 21, 1970 J. S. KAMBORIAN 3,506,992
MECHANISM FOR PREPARING A SHOE ASSEMBLY FOR END WIPING
Filed May 17, 1968 9 Sheets-Sheet 5

April 21, 1970 J. S. KAMBORIAN 3,506,992
MECHANISM FOR PREPARING A SHOE ASSEMBLY FOR END WIPING
Filed May 17, 1968 9 Sheets-Sheet 8

FIG.-23A

# United States Patent Office 3,506,992
Patented Apr. 21, 1970

3,506,992
MECHANISM FOR PREPARING A SHOE ASSEMBLY FOR END WIPING
Jacob S. Kamborian, 70 Crestwood Road,
West Newton, Mass. 01235
Filed May 17, 1968, Ser. No. 730,106
Int. Cl. A43d 21/00
U.S. Cl. 12—10.5                                17 Claims

ABSTRACT OF THE DISCLOSURE

A heel seat lasting machine having breast line pincers mounted to the legs of a heel clamping pad.

---

This invention is concerned with the wiping of the margin of an end of a shoe upper that is mounted on a last against an insole that is located on the last bottom. A problem arising in such a wiping operation is a tendency of the upper margin to fade away from the wipers during the wiping operation so that all of the potential width of the upper margin is not wiped against the insole. This invention provides a solution to this problem.

In one aspect of the invention, the end of the upper having the margin portion to be wiped against the insole is clamped against the last by clamp pad legs that are yieldably urged against the sides of the last. An upper margin engaging means is so mounted to each of the legs as to be in registry with and able to engage those side portions of the upper margin that are adjacent the end portion to be wiped against the insole when the pad legs are urged against the last. The upper margin engaging means are caused to engage the side portions of the upper margin and move them inwardly of the insole periphery to thereby prevent the undesired aforementioned fade away during the wiping operation.

Another aspect of the invention relates to the construction of the upper margin engaging means which takes the form of gripping means, each of which is mounted to an assembly. Each assembly is mounted to a housing for heightwise movement, and each housing is mounted to an arm for swinging movement in an upward and inward direction. After the gripping means have gripped the upper margin, the assemblies are raised to cause the gripping means to stretch the upper about the last and the housings are then swung upwardly and inwardly to effect the movement of the gripped margin portions inwardly of the insole periphery.

Another aspect of the invention relates to the construction of the gripping means. The gripping means are each comprised of an inner pincers jaw and an outer pincers jaw. The jaws are mounted to their associated assemblies with the inner pincers jaws being mounted above the outer pincers jaws for heightwise movement towards the outer jaws. The assemblies are movable from an initial position inwardly towards the last to carry the pincers jaws to their position of registry with the upper margin. During this movement the location of the inner jaws above the outer jaws precludes interference of the inner jaws with the upper margin. After the pincers jaws have been moved to their positions of registry, the inner jaws are moved downwardly against the outer jaws to grip the upper margin and the assemblies are moved inwardly to effect the movement of the gripped margin portions inwardly of the insole periphery.

In the illustrative embodiment of the invention, the invention is incorporated in a heel seat lasting machine wherein the heel portion of the upper margin is wiped against the heel seat portion of the insole and the breast line portions of the upper margin are moved by the pincers inwardly of the periphery of the breast line portions of the insole. However, the invention is equally applicable to a toe lasting machine wherein, for example, the toe portion of the upper margin is wiped against the insole in conjunction with the movement of the forepart portions of the upper margin inwardly of the periphery of forepart portions of the insole.

Figure 1:
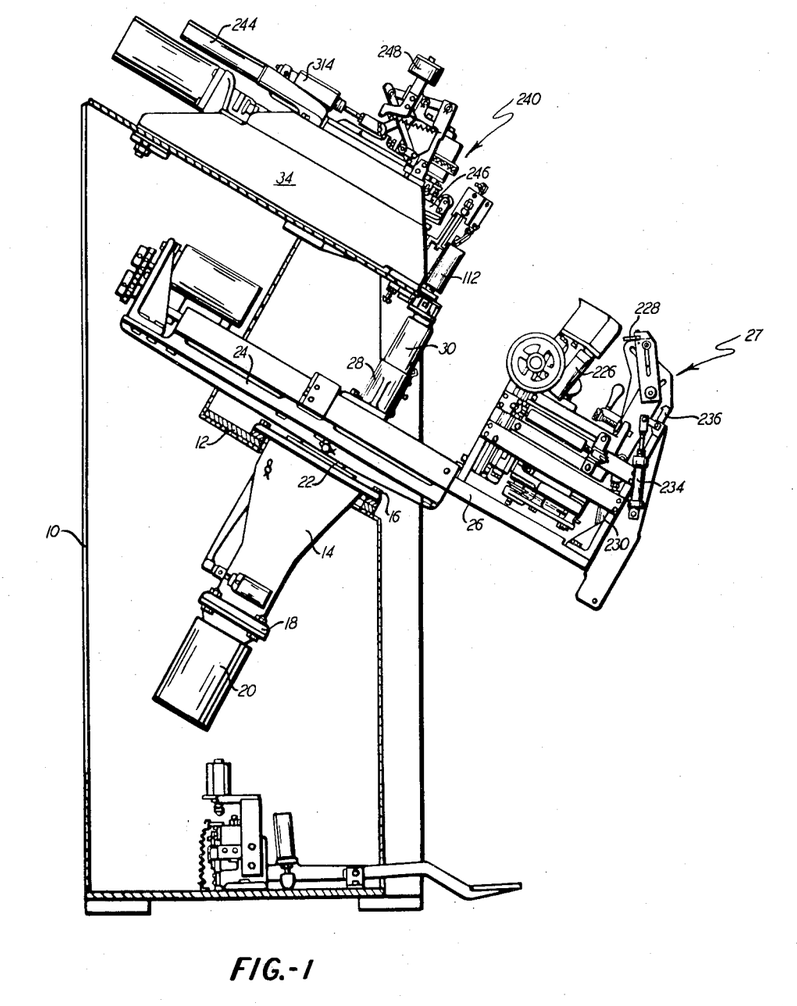
FIGURE 1 is a side elevation of a machine incorporating the invention.

Referring to FIGURE 1, the machine includes a frame 10 that comprises a base 12 and a housing 14. The machine is tilted about 30 degrees to enable the operator to have ready access thereto. For ease of explanation, the direction of the base 12 will be referred to as horizontal and the direction of the housing 14 will be referred to as vertical. In operating the machine, the operator stands to the right of the machine as seen in FIGURE 1, and parts moving toward the operator (left to right in FIGURE 1) will be described as moving forwardly while parts moving away from the operator (right to left in FIGURE 1) will be described as moving rearwardly.

The housing 14, which is secured to the base 12 by bolts 16, has a hanger 18 bolted to its bottom. An air operated motor 20, secured to the hanger 18, has a vertical piston rod (not shown) that extends upwardly into the housing 14. As shown more clearly in Patent No. 3,320,626, the piston rod of the motor 20 is connected to a post 22 that is slidably guided for vertical movement in the housing 14. The top of the post 22 is received in a socket in a shot supporting platform 24. A base 26 is mounted to the platform 24 and extends forwardly thereof. A framework 27 is mounted to and extends upwardly of the base 26.

The platform 24 has a base 28 secured thereto. A column 30 is secured to the base 28 and extends upwardly thereof. A shoe assembly support arrangement (FIGURE 17A), that comprises a last supporting plate 32 and a last pin 33, are mounted to the top of the column 30 with the last pin 33 extending upwardly of the plate 32.

Referring to FIGURES 3, 4 and 12–14, a head 34 is mounted on the frame 10 rearwardly of the column 30. A main slide plate 36 (FIGURE 12) is slidably mounted in the head 34 for forward-rearward movement. A fluid actuated motor 33, mounted to the head 34, has a piston rod 35 connected to a bracket 39 mounted to the slide plate 36 to effect this movement. A heel clamp slide 38 (FIGURES 3 and 4) is slidably mounted below the main slide plate 36 for forward-rearward movement in guideways 37 mounted to the main slide plate. Mounted to the rear of the heel clamp slide 38 is a bracket 40 having a pair of laterally extending arms 42. An air actuated motor 44 is pivoted to each of the arms 42 on a pin 46. Each motor 44 has a piston rod 47 extending forwardly thereof. A pair of arms 48 are pivotally mounted to pins 50 which are secured to the forward end of the heel clamp slide 38 by means of set screws 52. A shoulder 54 is provided on the heel clamp slide 38 rearwardly of the pins 50 to limit the extent that the arms 48 may pivot in a rearward direction. When at rest, the arms 48 are maintained in abutment against the shoulders 54 by means of tension springs 56 which are each connected at one end to an arm 42 and at its other end to a clip 58. The clips 58 are rigidly fastened to the outer extremities of the arms 48 by pins 60. A pair of sliding links 62, having longitudinal slots 64 formed at their midportions, are pivotally connected by means of pins 66 to angle brackets 68, the angle brackets 68 being rigidly fastened to the piston rods 47 of the motors 44. The links 62 are also moveably connected to the arms 48 by means of engagement of the slots 64 and the pins 60 so that activation of the motors 44 to cause the piston rods 47 to move forwardly (to the left in FIGURE 3) will cause the links 62 to have substantially linear forward movement, being guided by the pins 60. During the forward motion of the links 62, the pins 60 and consequently the arms 48 are rigidly maintained in a rearward position by means of the tension springs 56. Another link 70 is pivotally mounted at one end to each of the arms 48 by means of pins 72 which are secured to the arms 48 at their midportion. The other end of each link 70 is pivotally mounted to the pin 66 so that as the motors 44 impart substantially forward motion to the links 62, rotary motion about the pins 72 will be simultaneously imparted to the links 70. A bolt 74 is threaded into each arm 48 in such a manner that it is in registry with the plane of rotation of the links 70 so that as the links 70 rotate in response to actuation of the motors 44 they will abut the rearward ends of the bolts 74, thereby terminating the substantially forward linear motion of the links 62, and cause the arm 48, the link 62 and the link 70 to become rigid with respect to each other. When such a relative rigid relationship occurs, further actuation of the motors 44 to cause further forward motion of the piston rods 47 will cause the arms 48, the links 62 and the links 70 to rotate, as rigid units, about the pins 50, overcoming the tension of the springs 56 with the motors 44 swinging about the axes of the pins 46.

Figures 3, 4, 9:
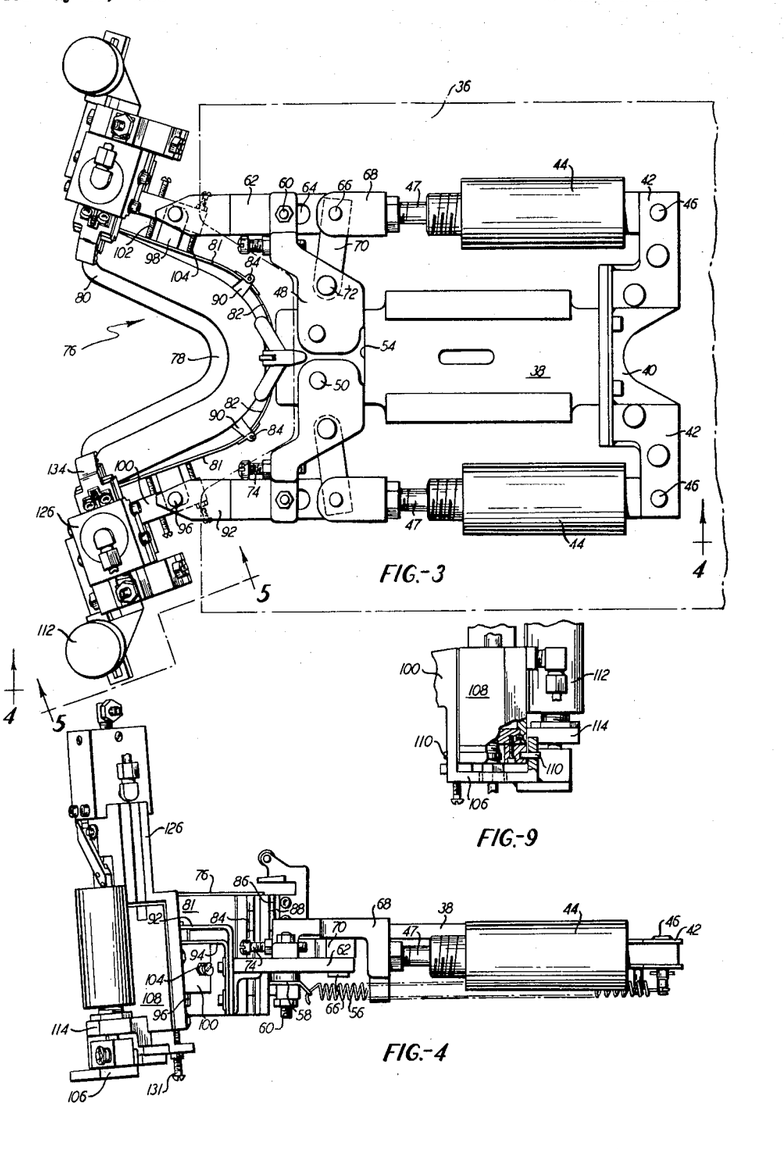
FIGURE 3 is a plan view of the members shown in FIGURE 2 as well as a heel clamp operating mechanism.
FIGURE 4 is a view taken on the line 4—4 of FIGURE 3.
FIGURE 9 is a view taken on the line 9—9 of FIGURE 6.
Figure 5:
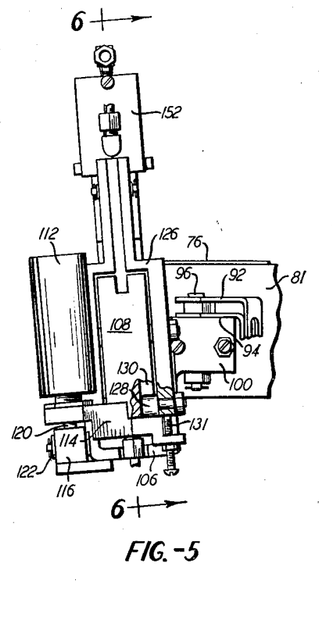
FIGURE 5 is a view taken on the line 5—5 of FIGURE 3.

As shown in FIGURES 3 and 4, a substantially U-shaped heel clamp pad 76, having a bight 78 and a pair of legs 80 extending forwardly of the bight on opposite sides of the bight, is located forwardly of the heel clamp slide 38 between the links 62. The clamp pad 76 is formed from a yieldable material such as rubber and has a hollow interior (FIGURES 20 and 21) so as to enable it to be inflated. Flexible metal front bands 81 and back bands 82 extend about the outer periphery of the pad 76 and are pivotally connected to each other by hinges 84 and 86. A positioning lug 88, extending rearwardly of the hinge 84 that pivotally connects the back bands 82, is received in a slot formed in the forward end of the heel clamp slide 38. The front ends of the front bands 81 are connected to the front ends of the exterior surfaces of the pad legs 80 by screws (not shown). Lugs 90, extending inwardly of the hinges 84, underlie the pad 76 to thereby support it. A pair of vertically spaced plates 92 and 94 are mounted to and extend forwardly of each link 62. The fronts of each pair of plates 92, 94 are pivoted to a pin 96. Each pin 96 extends through a lug 98, that is welded to its associated front band 81, and also extends through an arm 100. Adjustable bolts 102 and 104, threaded into the arm 100 on opposite sides of each pin 96 and bearing against their associated front bands 81, serve to lock the arms 100 in approximate parallel relationship to the front bands 81.

Referring to FIGURES 2–11, an extension 106 extends forwardly of each arm 100. A housing 108 is pivotally mounted to each extension 106 for inward-outward swinging movement on pivot pins 110 that are fixed to the extension 106. An air operated motor 112 is secured to an arm 114 that is mounted to each housing 108. A bar 116, mounted to each arm extension 106, has a vertical slot 118 that slidably receives the piston rod 120 of its associated motor 112. A bearing 122, mounted to each piston rod 120, is slidably received in a horizontal slot 124 in its associated bar 116.

A pincers assembly 126 is movably mounted to each housing 108 for heightwise movement by means of rolls 128 (FIGURES 5 and 10) that are mounted to the assemblies 126 and are slidable in grooves 130 in the housings 108. A bolt 131 is threaded into each arm 114 to bear against the bottom of its associated pincers assembly 126 and thus determine the lower positions of the pincers assemblies with respect to the housings 108.

Each assembly 126 has fixedly mounted thereto an outer jaw 132 of a breast line pincers 134. An inner jaw 136 of each pincers 134 is mounted to a lever 138 that is pivoted on a pin 140, and each pin 140 is slidable in a horizontal slot 142 formed in its associated assembly 126. An air actuated motor 144, formed in each housing 108, has an upwardly extending piston rod 146 that is pivoted to the bottom of a link 148. The top of each link 148 is pivoted to the mid-portion of its associated lever 138. The top of a lever 150 is pivoted to each assembly 126 above its associated slot 142. The bottom of each lever 150 is formed into a clevis that embraces its associated pin 140. An air operated motor 152 is secured to the top of each assembly 126. Each motor 152 has a downwardly extending piston rod 154 that is pivoted to the top of a link 156. The bottom of each link 156 is pivoted to the midportion of its associated lever 150, Tension springs 158, extending between the motors 152 and the levers 138, yieldably urge the levers 138 and the inner pincers jaws 136 upwardly about the axes of the pins 140.

Figure 13:
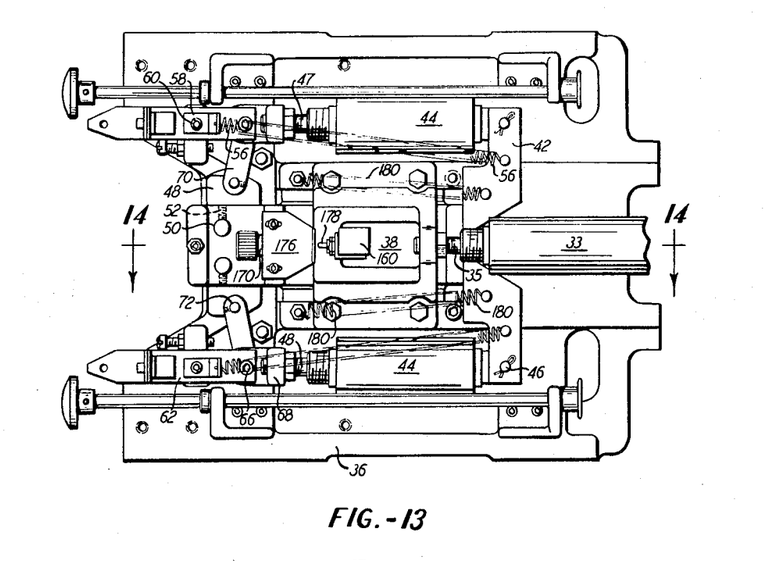
FIGURE 13 is a bottom view of the heel clamp operating mechanism.
Figure 14:
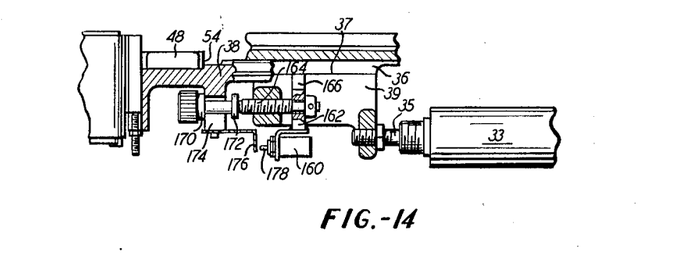
FIGURE 14 is a view taken on the line 14—14 of FIGURE 13.

Referring to FIGURES 13 and 14, a pilot valve 160 depends from a bar 162. The bar 162 has a hole formed therein for rotatable accommodation of the rearward end of a shaft 164. The midportion of the shaft 164 is threaded into the forward end of the bracket 39 so as to be rigidly connected to and partake of the motion of the main slide plate 36. A finger 166 extends upwardly from and is made integral with the bar 162 and is contained in a longitudinal slot 168 (FIGURE 12) formed in the heel clamp slide 38. Formed at the forward end of the shaft 164 are spaced collars 170 and 172. A depending leg 174, which is an integral part of the heel clamp slide 38, straddles the shaft 164 at a point intermediate the collars 170 and 172. It may thus be seen that the heel clamp slide 38 and all components mounted thereto may slide with respect to the main slide plate 36 a distance that is governed by the clearance between the depending leg 174 and the collars 170 and 172. A stop 176 is secured to the bottom of the depending leg 174 and extends rearwardly to be in alignment with the plunger 178 of the pilot valve 160. In the idle condition of the machine, the heel clamp slide 38 is maintained in a forward position relative to the main slide plate 36 with the depending leg 174 in abutment with the collar 170 by means of a pair of tension springs 180 that have one end connected to the bracket 39 and the other end connected to an arm 42 of the bracket 40 which is mounted to the rear of the heel clamp slide 38.

Figure 15:
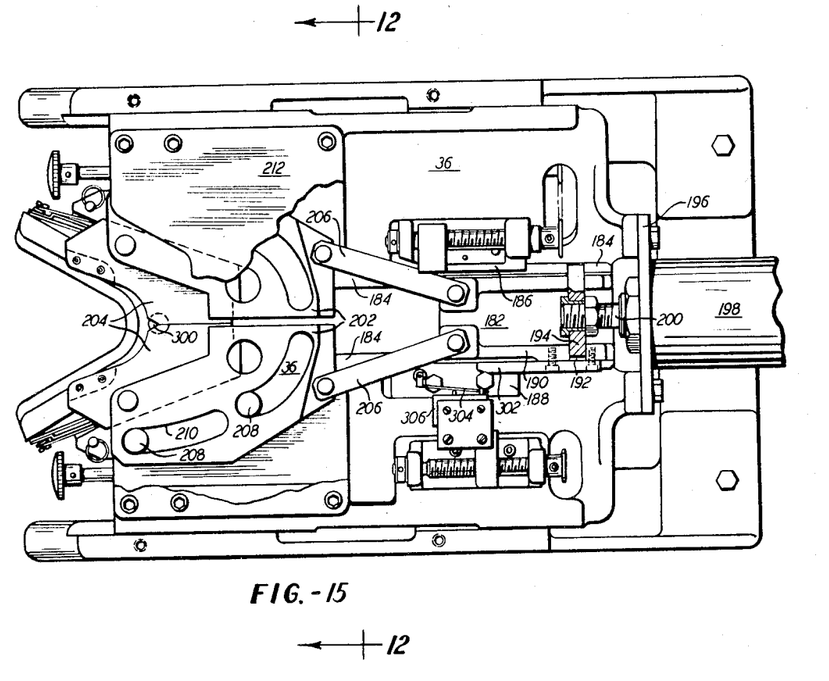
FIGURE 15 is a plan view of wipers and a wiper operating mechanism.

Referring to FIGURE 15, a wiper slide 182 is slidably mounted for forward and rearward movement in guideways 184 formed in the upper surface of the main slide plate 36. The wiper slide 182 is retained in the guideways 184 by gibs 186 and 188. The wiper slide 182 has a pair of upwardly extending longitudinal walls 190, each wall having a vertical slot 192 formed therein. A connecting bar 194 rests laterally within the slots 192. The rear of the main slide plate 36 is formed into a bracet 196 to which is mounted an air actuated motor 198 having a forwardly extending piston rod 200, the piston rod 200 being connected to the connecting bar 194 so that activation of the motor 198 will cause the wiper slide 182 and all components carried thereon to move forwardly or rearwardly in the guideways 184. Slidably mounted to the upper surface of the forward end of the main slide plate 36 are a pair of wiper cams 202 to which are mounted wipers 204. A pair of links 206 pivotally connect the wiper slide 182 and the wiper cams 202 so that motion may be transmitted to the wiper cams 202 and consequently the wipers 204 upon actuation of the wiper slide 182 by the air motor 198. For the purpose of guiding the wiper cams 202 in a desirable predetermined path, rollers 208 are rotatably mounted to the main slide plate 36 and protrude upwardly into cam slots 210 formed in the wiper cams 202 for accommodation of the rollers 208. The wiper cams 202 are maintained in sliding contact with the main slide plate 36 by means of a cover 212 which is bolted to the main slide plate 36 and is spaced therefrom by means of spacers 214 (FIGURE 12), the spacing between the main slide plate 36 and the cover 212 being such that the wiper cams 202 may have horizontal sliding motion only, there being insufficient clearance for allowance of any substantial vertical movement.

Figure 2:
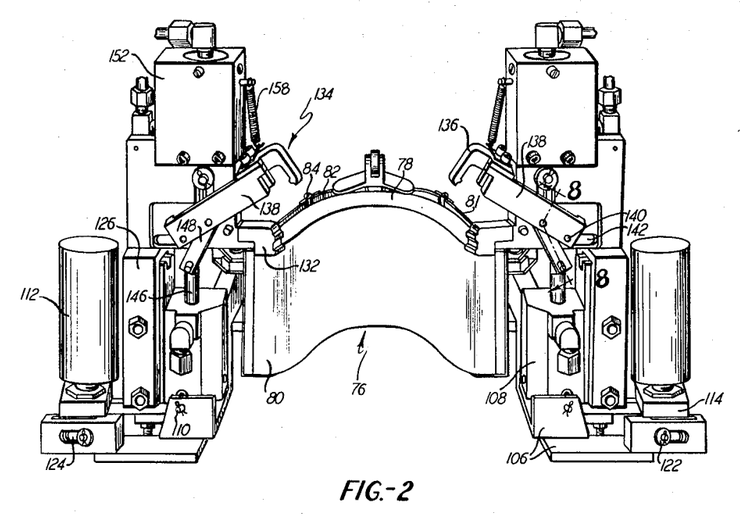
FIGURE 2 is a front elevation of a heel clamp pad of the machine having the breast line pincers mounted thereto.
Figures 6, 7, 8:
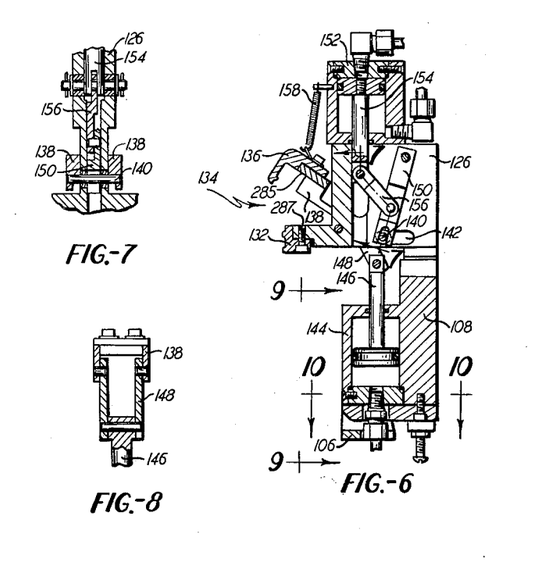
FIGURE 6 is a section taken on the line 6—6 of FIGURE 5.
FIGURE 7 is a section taken on the line 7—7 of FIGURE 6.
FIGURE 8 is a section taken on the line 8—8 of FIGURE 2.
Figure 10:
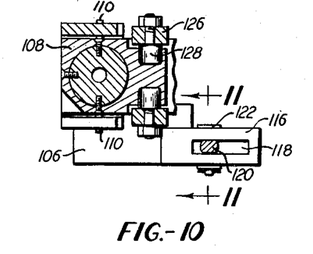
FIGURE 10 is a view taken on the line 10—10 of FIGURE 6.
Figure 11:
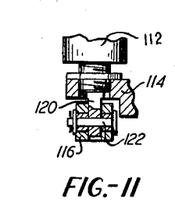
FIGURE 11 is a view taken on the line 11—11 of FIGURE 10.
Figure 12:
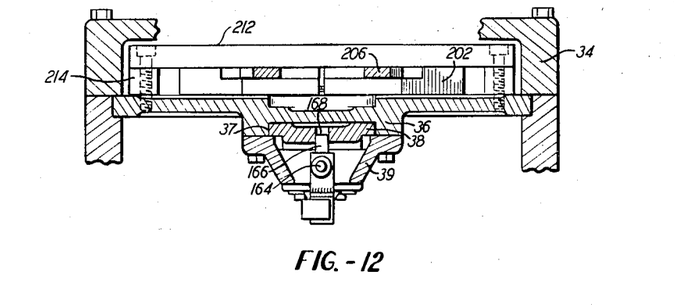
FIGURE 12 is a view taken on the line 12—12 of FIGURE 15.

In the idle condition of the machine: the piston rod of the motor 20 is retracted into this motor to maintain the last supporting plate 32, the last pin 33, the base 26 and the framework 27 in a lowered position; the piston rod 35 is retracted into the motor 33 to maintain the main slide plate 36 and the parts carried thereby in a rearward position with the heel clamp pad 76 and the wipers 204 in an out-of-the-way position; the piston rods 47 are retracted into the motors 44 to maintain the heel clamp pad 76 in a non-working open position; the heel clamp pad 76 is in a deflated condition; the piston rods 120 are retracted into the motors 112 to maintain the housings 108 and the parts carried thereby in outer positions with respect to the axes of the pins 110; there is no pressurized air in the cylinders 144 so that their pistons are maintained in the median position shown in FIGURE 6 by means of the springs 158 acting through the levers 138, the links 148 and the piston rods 146, thus leaving the inner pincers jaws 136 in the upper positions shown in FIGURE 2; the pincers assemblies 126 are bottomed against the bolts 131 by gravity; the piston rods 154 are retracted into the motors 152 as shown in FIGURE 6 to maintain the pins 140 at the inner ends (left end in FIGURE 6) of the slots 142 to thereby urge the inner pincers jaws 136 inwardly of the outer pincers jaws 132; and the piston rod 200 is retracted into the motor 198 to thereby maintain the wipers 204 in the retracted position shown in FIGURE 15.

Figure 17:
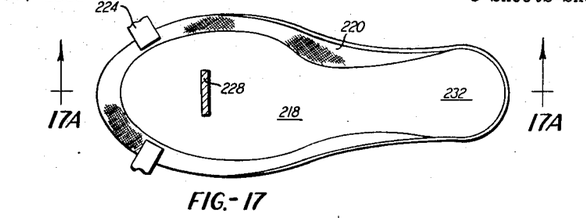
FIGURE 17 is a representation of a shoe assembly as it appears in the machine near the beginning of the machine cycle.
Figure 17A:
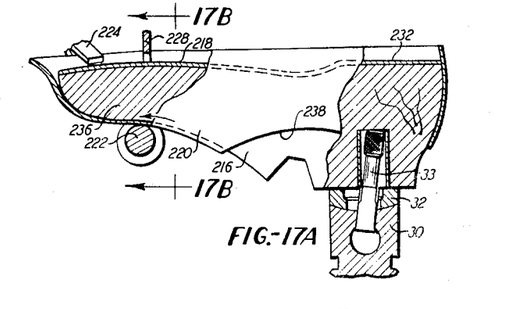
FIGURE 17A is a view taken on the line 17A—17A of FIGURE 17.
Figure 17B:
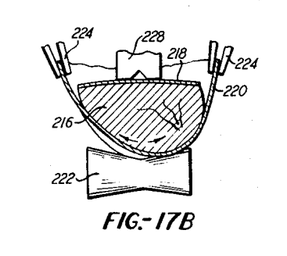
FIGURE 17B is a view taken on the line 17B—17B of FIGURE 17A.

Referring to FIGURES 17, 17A and 17B, a shoe assembly is provided that comprises a last 216 having an insole 218 secured to its bottom and an upper 220 mounted thereon in such a manner that the margin of the upper extends away from the insole. The shoe assembly is placed bottom-up on the shoe assembly supporting plate 32 with the last pin 33 entering the conventional last pin hole in the last. The toe portion of the upper and last is supported on a toe rest roller 222 and the forepart portions of the upper margin are inserted between the open jaws of forepart pincers 224. The toe rest roller 222 and the forepart pincers 224 are mounted to the framework 27 as shown in pending application S.N. 683,939 filed Nov. 17, 1967. After this, the forepart pincers are caused by actuation of air actuated motors 226 (FIGURE 1) to close on and grip the forepart portions of the upper margin and a toe hold-down 228 (FIGURE 1) is caused by an air actuated motor 230 to move under relatively low pressure against the forepart of the insole 218. Reference is made to the aforesaid application S.N. 683,939 for a more detailed disclosure of the toe hold-down 228. The shoe assembly is thus held between the toe hold-down 228 and the toe rest 222 with the heel seat portion 232 of the insole maintained in a horizontal plane. This is followed by the actuation of an air-operated motor 234 (FIGURE 1) to cause a pawl 236 to lock the toe hold-down 228 against movement and is also followed by the actuation of mechanism shown in said application S.N. 683,939 to move the forepart pincers 224 forwardly and upwardly to thereby cause a firm wrapping of the upper about the heel of the last, a stretching of the upper tightly about the vamp 236 (FIGURE 17A) of the last and a stretching of the topline 238 (FIGURE 17A) of the upper tightly on the last.

Figure 20:
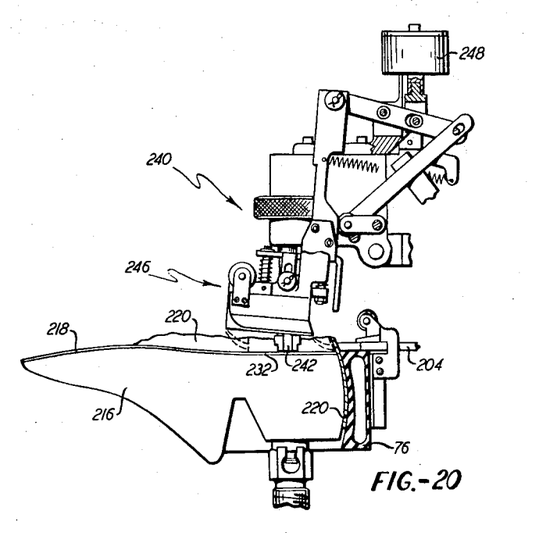
FIGURES 20 and 21 show a cement applying mechanism for applying cement to the insole.
Figure 21:
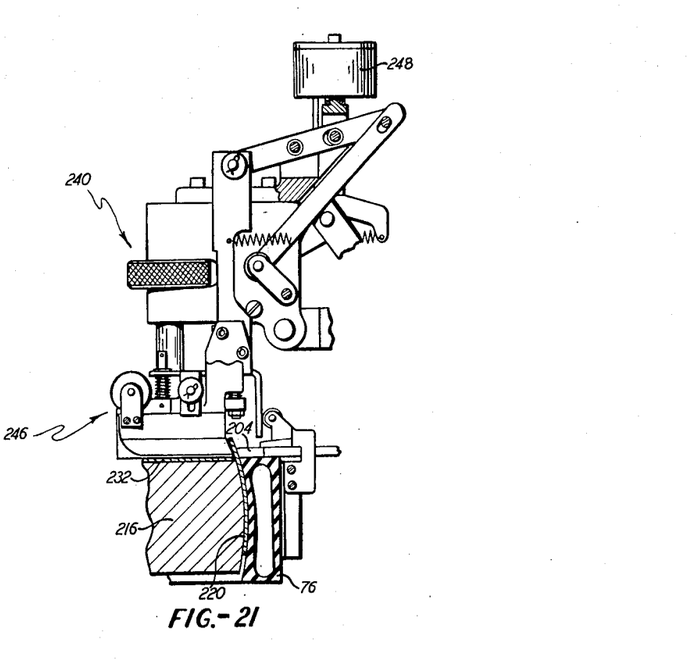

The machine includes a heel hold-down mechanism 240 (FIGURES 1, 20 and 21), shown in greater detail in pending application S.N. 562,136 filed July 1, 1966, that includes a hold-down foot 242. After the above described stretching operation of the forepart pincers 224 has been completed, the hold-down foot 242 is caused by actuation of an air operated motor 244 (FIGURE 1) to move from an initial rearward position to a forward position such that the heel hold-down foot 242 is positioned directly above the heel portion 232 of the insole 218. This is followed by an actuation of the motor 20 to raise the toe post 22 and the shoe assembly supported thereby until the insole heel portion 232 is brought into abutment with the bottom of the hold-down foot 242 as indicated in FIGURE 20.

Figure 18:
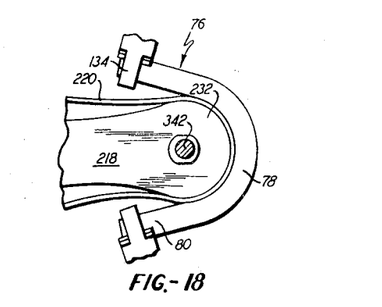
FIGURE 18 is a representation of the shoe assembly in the machine prior to the clamping of the upper by the heel clamp pad.

As the toe post 22 rises, the motor 33 is activated to move the main slide plate 36 to a forward working position and thereby carry the heel clamp pad 76 and the wipers 204 forwardly from their out-of-the-way positions until the bight 78 of the heel clamp pad 76 abuts the heel end of the shoe assembly, as shown in FIGURE 18, thereby terminating forward motion of the heel clamp pad 76. The main slide plate 36 and the wipers 204 carried thereon continue to move forwardly until the collar 172 (FIGURE 14) on the shaft 164 abuts the depending leg 174 of the heel clamp slide 38. Simultaneously with the abutment of the collar 172 and the depending leg 174, the plunger 178 of the pilot valve 160 is depressed by reason of its abutment with the stop 176 to thereby actuate the pilot valve 160. The actuation of the pilot valve 160, by means of a control arrangement shown in pending application Ser. No. 478,185 filed Aug. 9, 1965, serves to lock the piston rod 35 of the motor 33 in position to thereby lock the main slide plate 36 in its forward position and also causes actuation of the motors 44.

Figure 19:
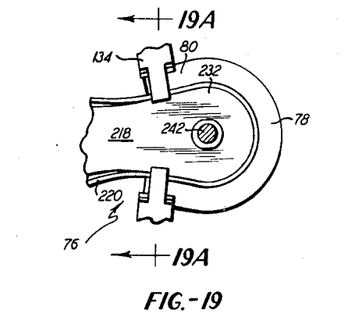
FIGURE 19 is a representation of the shoe assembly in the machine after it has been clamped by the heel clamp pad.

The actuation of the motors 44 causes the heel clamp driving mechanism shown in FIGURES 3, 4 and 13 to operate in the manner described above to move the heel clamp pad from the FIGURE 18 to the FIGURE 19 position. The legs 80 of the heel clamp pad 76 are initially stretched forwardly towards the toe of the shoe assembly and are subsequently swung inwardly until they engage the side walls of the shoe assembly in the regions of the breast lines, so that all of the inner wall of the pad 76 engages the heel of the shoe assembly. Concomitantly with the actuation of the motors 44, compressed air is introduced into the hollow interior of the heel clamp pad 76 to thereby inflate it and cause it to press more firmly against the upper.

Figure 19A:
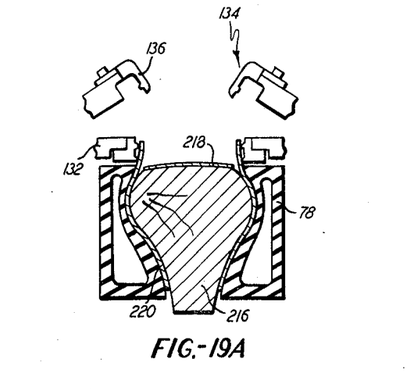
FIGURE 19A is a view taken on the line 19A—19A of FIGURE 19.

Due to the mounting of the breast line pincers 134 to the heel clamp pad 76 described above, the inward movement of the pad legs 80 causes a corresponding inward movement of the pincers 134 to thereby locate the pincers 134 in registry with the breast line portions of the upper margin, as indicated in FIGURE 19A, regardless of the width of the breast line portion of the last 216. At this time the outer pincers jaws 132 are located outwardly of the breast line portions of the upper margin, the inner pincers jaws 136 are located above the breast line portion of the upper margin, and the breast line portions of the upper margin are held erect above the insole 218 due to the aforesaid movement of the forepart pincers 224 and the clamping action of the heel clamp pad 78. Due to the retention of the inner jaws 136 in their upper positions as shown in FIGURE 6 at this time, the inner jaws did not intersect and interfere with the breast line portions of the upper margin during the inward movement of the pincers 134 and thus did not cause any premature laying down of the upper margin such as to prevent the upper margin from being gripped properly when the inner jaws 136 are moved against the outer jaws 132 as described below. During the inward movement of the pincers 132, the outer jaws 132 engage the upper margin and move it against the periphery of the insole.

Figure 23:
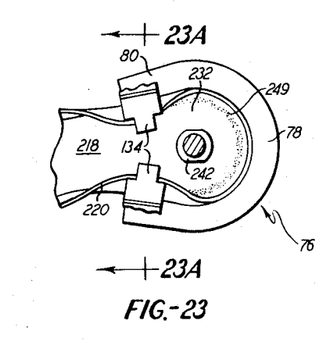
FIGURE 23 is a representation of the shoe assembly as it appears in the machine after the breast line portions of the upper margin have been moved inwardly over the insole periphery by the breast line pincers.

The machine incorporates a cement applicator 246 (FIGURES 20 and 21) that is mounted to the heel hold-down mechanism 240 and that is shown in greater detail in the aforementioned application Ser. No. 562,136. At this time, a motor 248 is actuated to move the cement applicator 246 from the FIGURE 20 to the FIGURE 21 position to bring the cement applicator into flush engagement with the periphery of the insole heel seat portion 232. This is followed by an extrusion of a ribbon of cement 249 (FIGURE 23) through the cement applicator 246 against the periphery of the insole heel seat portion 232 and an actuation of the motor 248 to return the cement applicator 246 to the FIGURE 20 position.

Figure 16:
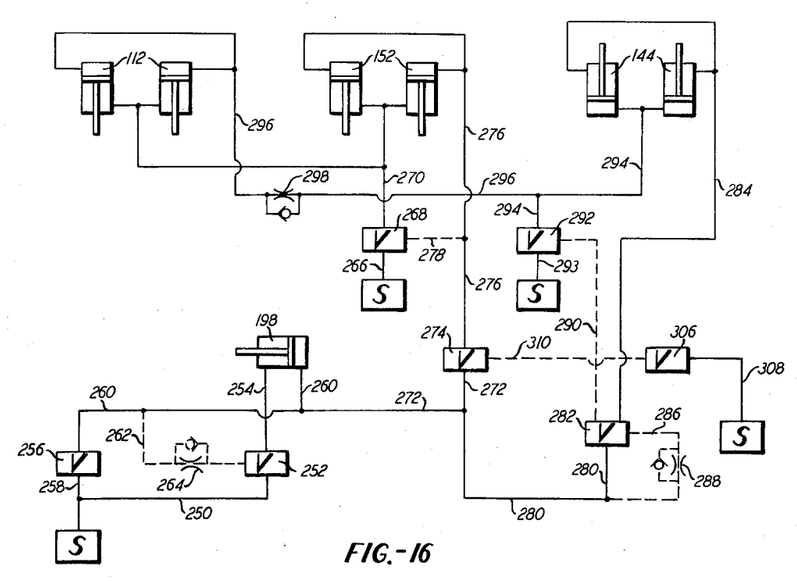
FIGURE 16 is a schematic drawing of a portion of the control circuit of the machine.

Referring to FIGURE 16, which illustrates a portion of the pneumatic control circuit of the machine with a source of pressurized air labelled S, the wipers 204 are maintained in their idle position by pressurized air passing from the source S through a line 250, a normally open valve 252 and a line 254 to the motor 198. At this time, a valve 256 is opened to enable pressurized air to pass from the source S through a line 258, the valve 256 and a line 260 to the motor 198 so as to cause the motor 198 to move the wipers 204 forwardly in the below described wiping stroke. However, the wipers are prevented at this time from moving through their wiping stroke because of the pressurized air in the line 254. The shifting of the valve 256 enables air to pass from the line 260 through a pilot line 262 and a flow control valve 264 to shift the valve 252 to closed position after the lapse of a time interval. When the valve 252 is shifted, the air in the line 254 is vented to atmosphere through the valve 252 so that the motor 198 can effect the wiping stroke of the wipers 204.

Figure 22:
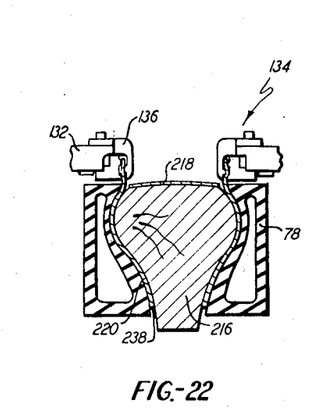
FIGURE 22 is a representation of the shoe assembly as it appears in the machine when the breast line portions of the upper margin have been gripped by breast line pincers.

The motors 112 and 152 are maintained in their idle position by pressurized air passing from the source S through a line 266, a normally open valve 268 and a line 270 to these motors. The aforementioned shifting of the valve 256 enables pressurized air to pass from the line 260 through a line 272, a normally open valve 274, a line 276, and a pilot line 278 to the valve 268 to shift the valve 268 to closed position and enable the pressurized air in the motors 112 and 152 to vent to atmosphere through the line 270 and the valve 268. The shifting of the valve 256 also enables pressurized air to pass from the line 272 through a line 280, a valve 282 and a line 284 to the motors 144 to actuate these motors to lower the piston rods 146. The shifting of the valve 256 also enables pressurized air to pass from the line 276 to the motors 152 to actuate these motors to lower the piston rods 154. These actuations of the motors 144 and 152 take place before the lapse of the time interval at which the wiping stroke is commenced. The lowering of the piston rods 146, by means of the links 148, causes the inner jaw 136 of each breast line pincers 134 to swing downwardly about the axis of its associated pin 140 against the force of its associated spring 158 until a bottom surface 285 (FIGURE 6) of each jaw 136 engages the top surface 287 of its associated jaw 134 to bring each jaw 136 to a position that is inward of and in registration with its associated outer jaw 132 so that the breast line portions of the margin of the upper 220 will be located between the jaws of the pincers 134. The lowering of the piston rods 154, by means of the links 156 and levers 150, causes the pins 140 to move outwardly in the slots 142 under the yieldable forces of the pressurized air in the motors 152 so as to cause the breast line portion of the upper margin to be gripped between the jaws 134 as indicated in FIGURE 22.

A pilot line 286, having a flow control valve 288 therein, extends between the line 280 and the valve 282. The flow control valve 288 is so set that after the upper margin has been gripped by the jaws 134 air passes through the valve 288 and the line 286 to the valve 282 to shift the valve 282. The shifting of the valve 282 enables the pressurized air that had been entering the motors 144 through the line 284 to vent to atmosphere through the valve 282 and enables pressurized air to pass from the valve 282 through a pilot line 290 to a valve 292 to shift the valve 292. The shifting of the valve 292 enables pressurized air to pass from the source S through a line 293, the valve 292 and a line 294 to the motors 144 so as to raise the piston rods 146 under the yieldable forces of the pressurized air. Because of the positions of the members 148, 150 and 156 at this time and the horizontal forces being applied at this time to the inner jaws 136 by the motors 152, the raising of the piston rods 146 does not raise the inner pincers jaws 136, but instead raises the pincers assemblies 126 with respect to the housings 108 as permitted by the rolls 128 and grooves 130 to thereby raise the pincers 134 and the breast line portions of the upper margin gripped by the pincers 134 under the yieldable forces of the pressurized air in the motors 144. This has the effect of stretching the breast line portions of the upper about the last, the clamping force of the pad legs 78 being insufficient to prevent this stretching, but being sufficient to keep the top line 238 (FIGURE 22) in position on the last.

Figure 23A:
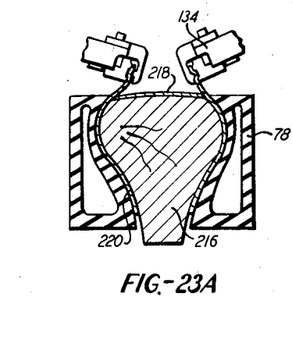
FIGURE 23A is a view taken on the line 23A—23A of FIGURE 23.

A line 296, having a flow control valve 298 therein, extends from the line 294 to the motors 112. By the time the pincers 134 have completed their upward movement, the flow control valve 298 permits pressurized air to enter the motors 112 so as to apply downward forces to the piston rods 120 to thereby raise the motors 112 and swing the motors 112 together with the housings 108, the pincers assemblies 126 and the pincers 134 upwardly and inwardly about the axes of the pins 110. This causes the pincers 134 to move to the position shown in FIGURES 23 and 23A. This has the effect of laying the breast line portions of the upper margin over the insole at the breast line so that, in the below described wiping operation by the wipers 204, the wipers can effectively wipe the heel portion of the upper margin against the insole without the upper margins fading away from the wipers.

Figure 24:
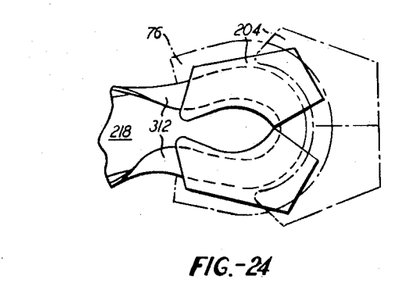
FIGURE 24 is a view of the shoe assembly as it appears in the machine at the completion of the heel wiping operation.

By now the flow control valve 264 is effective to shift the valve 252 as described above so that the wipers 204 can effect their wiping stroke in response to actuation of the motor 198. The actuation of the motor 198 causes the wiper slide 182 to move forwardly thereby imparting motion to the wiper cams 202 and consequently the wipers 204 by means of the links 206. The wipers 202 are guided in their movement by the engagement of the cam slots 210 with the rollers 208 in a path that is both forwardly translating and inwardly swinging about the vertex 300 (FIGURE 15) of the wipers so as to cause the wipers to move from the phantom position of FIGURE 24 to the solid position and thereby engage the upstanding lasting margin that extends from the heel end extremity of the shoe assembly to the breast line areas gripped by the pincers 134 and fold or wipe the margin against the insole 218 and bond the margin to the insole by means of the cement ribbon 249. The wipers should be actuated to move through their wiping stroke no earlier than concomitantly with the movement of the pincers 134 to the FIGURES 23 and 23A position.

During the wiping stroke, a cam 302 (FIGURE 15), fixed to the wiper slide 182, intersects a valve actuator 304 and opens a valve 306, that is mounted to the main slide plate 36. The opening of the valve 306 enables pressurized air to pass from the source through a line 308, the valve 306 and a pilot line 310 to the valve 274 to shift the valve 274 to closed position. This has the effect of shutting off the flow of pressurized air to the motors 152 through the line 276. It also causes the valve 268 to return to open position because of the shutting off of the flow of pressurized air through the pilot line 278 so that pressurized air can again enter the motors 152 through the line 270. As a result, the piston rods 154 of the motors 152 are raised to thereby, by means of the links 156 and the levers 150, move the inner jaws 136 of the pincers 134 inwardly so as to cause the pincers 134 to release the breast line portions of the upper margin. Therefore the wipers 204 at the completion of the wiping stroke will not create a stress in the upper margin that is opposed to the stress imparted by the pincers 134 which would have the undesirable effect of tearing the upper margin. Because the breast line areas of the upper margin, indicated in FIGURE 24 by number 312, were laid down against the insole by the pincers 134 at the commencement of the wiping stroke, the wipers 202 are better able to wipe or fold the full width of the heel portion of the upper margin against the insole. The pincers 134 are located forwardly of the forwardmost position assumed by the wipers 202 at the completion of the wiping stroke, so that there is no danger of interference between the wipers and these pincers.

During the latter part of the wiping stroke the forepart pincers 224 are opened to release the forepart portions of the upper margin and the forepart pincers 224 are returned to their original positions, and the motors 230 and 234 are actuated to unlock the toe hold-down 228 and return it to its original position.

At or near the end of the wiping stroke a motor 314 (FIGURE 1) is actuated to effect a raising of the heel hold-down foot 242 from the insole bottom, thus transferring the upwardly directed forces from the hold-down foot 242 to the bottom surfaces of the wipers 204. At approximately the same time as the heel hold-down foot 242 is raised, air is introduced under increased pressure to the motor 20 to cause the wiped upper margin to be pressed onto the insole and the bottom surfaces of the wipers 204 to effect a more permanent bond between the insole and the upper margin. When this increased bedding pressure has been applied for a sufficient length of time, the machine parts that have not already done so are returned to their idle positions and the machine cycle is completed.

I claim:

1. In a lasting machine having means for supporting bottom-up a shoe assembly that comprises a last having an upper mounted thereon and an insole located on its bottom in such a manner that a selected end of the shoe assembly faces rearwardly so that an area of the margin of the upper that is located above the insole and that extends from said selected end forwardly along the last may be wiped against the insole, means for moving portions of the upper margin that are forward of said area of the upper margin inwardly of the insole periphery so that the entire potential width of said area of the upper margin may be wiped against the insole comprising: a pair of clamp pad legs located exteriorly of said sides of the last; means for yieldably urging said legs inwardly against the sides of the shoe assembly; an upper margin engaging means so mounted to each of said legs as to be in registry with said portions of the upper margin when said legs are yieldably urged inwardly against the sides of the shoe assembly; and means mounting each of said engaging means to its associated leg for inward movement so as to enable the engaging means to engage said upper margin portions and move them inwardly of the insole periphery.

2. In a lasting machine having means for supporting bottom-up a shoe assembly that comprises a last having an upper mounted thereon and an insole located on its bottom in such a manner that a selected end of the shoe assembly faces rearwardly so that an area of the margin of the upper that is located above the insole and that extends from said selected end forwardly along the last may be wiped against the insole, means for moving the portions of the upper margin that are forward of said area of the upper margin inwardly of the insole periphery so that the entire potential width of said area of the upper margin will be wiped against the insole comprising: a pair of clamp pad legs located exteriorly of said sides of the last; means for yieldably urging said legs inwardly against the sides of the shoe assembly; an upper margin gripping means so mounted to each of said legs as to be in registry with said portions of the upper margin when said legs are yieldably urged inwardly against the sides of the shoe assembly; means, operative when the gripping means are in registry with said margin portions, to cause the gripping means to grip said margin portions; means mounting each of said gripping means to its associated leg for inward movement so as to pull the gripped upper margin portions inwardly of the insole periphery; and means, operative after the gripping means have been caused to grip said margin portions, to effect said inward movement of the gripping means.

3. The machine as defined in claim 2 further comprising: wiping means, mounted for movement through a wiping stroke, so as to effect said wiping of said area of the upper against the insole and means, effective during the wiping stroke, to cause the gripping means to release the gripped margin portions.

4. The machine as defined in claim 2 further comprising: means mounting each of said gripping means to its associated pad leg for upward movement; and means, operative after the gripping means have been caused to grip said margin portions and prior to said inward movement, to effect said upward movement of the gripping means.

5. The machine as defined in claim 2 wherein said pad legs form the forward ends of a substantially U-shaped clamp pad, and further comprising: a lug secured to and extending outwardly of each pad leg; an arm rigidly secured to each lug; and means mounting each of the gripping means to its associated arm.

6. The machine as defined in claim 5 further comprising: yieldable drive means connected to each of said lugs to effect said inward yieldable urging of the pad legs.

7. The machine as defined in claim 2 wherein said legs are initially located spacedly from the sides of the last; wherein each of said gripping means comprises: an outer pincers jaw; an inner pincers jaw located inwardly of its associated outer pincers jaw; and means mounting each inner jaw for heightwise movement towards and away from its associated outer jaw; and further comprising: means for initially maintaining each inner jaw in a raised position above its associated outer jaw; yieldable drive means connected to the gripping means and actuable to move the legs inwardly and thereby effect said yieldable urging of the legs against the sides of the shoe assembly, said raised position of the inner jaws precluding interference between the inner jaws and said margin portions during the inward movement of the legs; and means for thereafter lowering each inner jaw against its associated outer jaw to effect the gripping of the margin portions by the gripping means.

8. In a lasting machine having means for supporting bottom-up a shoe assembly that comprises a last having an upper mounted thereon and an insole located on its bottom in such a manner that a selected end of the shoe assembly faces rearwardly so that an area of the margin of the upper that is located above the insole and that extends from said selected end forwardly along the last may be wiped against the insole, means for moving the portions of the upper margin that are forward of said areas of the upper margin inwardly of the insole periphery so that the entire potential width of said area of the upper margin will be wiped against the insole comprising: a pair of clamp pad legs located exteriorly of said sides of the last; means for yieldably urging said legs inwardly against the sides of the shoe assembly; an arm secured to and extending outwardly of each pad leg; a housing pivotally mounted to each arm for swinging movement in a direction that is upward and inward of an initial position; an assembly mounted to each housing for heightwise movement; an upper margin gripping means so mounted to each assembly as to be in registry with said portions of the upper margin when said legs are yieldably urged inwardly against the sides of the shoe assembly; means for initially maintaining the housing in their initial positions; means for initially maintaining the assemblies in lowered positions with respect to the housings; means, operative when the gripping means are in registry with said margin portions, to cause the gripping means to grip said margin portions; means operative thereafter to raise the assemblies from said lowered positions to stretch the upper about the last; and means operative thereafter to effect said swinging movement of the housings to thereby pull the gripped upper margin portions inwardly of the insole periphery.

9. The machine as defined in claim 8 further comprising: wiping means, mounted for movement through a wiping stroke, so as to effect said wiping of said area of the upper against the insole; and means, effective during the wiping stroke, to cause the gripping means to release the gripped margin portions.

10. The machine as defined in claim 8 wherein said pad legs form the forward ends of a substantially U-shaped clamp pad, and further comprising: a lug secured to and extending outwardly of each pad leg; and means rigidly securing each of said arms to a lug.

11. The machine as defined in claim 10 further comprising: yieldable drive means connected to each of said lugs to effect said inward yieldable urging of the pad legs.

12. The machine as defined in claim 8 wherein said legs are initially located spacedly from the sides of the last; wherein each of said gripping means comprises: an outer pincers jaw; an inner pincers jaw located inwardly of its associated outer pincers jaw; and means mounting each inner jaw for heightwise movement towards and away from its associated outer jaw; and further comprising: means for initially maintaining each inner jaw in a raised position above its associated outer jaw; yieldable drive means connected to the gripping means and actuable to move the legs inwardly and thereby effect said yieldable urging of the legs against the sides of the shoe assembly, said raised positions of the inner jaws precluding interference between the inner jaws and said margin portions during the inward movement of the legs; and means for thereafter lowering each inner jaw against its associated outer jaw to effect the gripping of the margin portions by the gripping means.

13. In a lasting machine having means for supporting bottom-up a shoe assembly that comprises a last having an upper mounted thereon and an insole located on its bottom in such a manner that a selected end of the shoe assembly faces rearwardly so that an area of the margin of the upper that is located above the insole and that extends from said selected end forwardly along the last may be wiped against the insole, means for moving portions of the upper margin that are forward of said area of the upper margin inwardly of the insole periphery so that the entire potential width of said area of the upper margin may be wiped against the insole comprising: an arm located exteriorly of each of said sides of the last; a housing pivotally mounted to each arm for swinging movement in a direction that is upward and inward of an initial position; an assembly mounted to each housing for heightwise movement; an upper margin gripping means mounted to each assembly and adapted to be in registry with said portions of the upper margin; means for initially maintaining the housings in their initial positions; means for initially maintaining the assemblies in lowered positions with respect to the housings; means, operative when the gripping means are in registry with said margin portions, to cause the gripping means to grip said margin portions; means operative thereafter to raise the assemblies from said lowered positions to stretch the upper about the last; and means operative thereafter to effect said swinging movement of the housings to thereby pull the gripped upper margin portions inwardly of the insole periphery.

14. The machine as defined in claim 13 further comprising: wiping means, mounted for movement through a wiping stroke, so as to effect said wiping of said area of the upper against the insole; and means, effective during the wiping stroke, to cause the gripping means to release the gripped margin portions.

15. The machine as defined in claim 13 further comprising: means mounting each of said arms for movement from an outer position to an inner position in which the gripping means are in registry as aforesaid; and wherein each of said gripping means comprises: an outer pincers jaw; an inner pincers jaw located inwardly of its associated outer pincers jaw; and means mounting each inner jaw for heightwise movement towards and away from its associated outer jaw; and further comprising: means for initially maintaining said arms in their outer positions; means for initially maintaining each inner jaw in a raised position above its associated outer jaw; means operative to thereafter move the arms to said inner positions, said raised positions of the inner jaw precluding interference between the inner jaws and said margin portions during said inward movement of the arms; and means for thereafter lowering each inner jaw against its associated outer jaw to effect the gripping of the margin portions by the gripping means.

16. In a lasting machine having means for supporting bottom-up a shoe assembly that comprises a last having an upper mounted thereon and an insole located on its bottom in such a manner that a selected end of the shoe assembly faces rearwardly so that an area of the margin of the upper that is located above the insole and that extends from said selected end forwardly along the last may be wiped against the insole, means for moving the portions of the upper margin that are forward of said area of the upper margin inwardly of the insole periphery so that the entire potential width of said area of the upper margin will be wiped against the insole comprising: an arm located exteriorly of each of said sides of the last; and assembly mounted to each arm for movement that is inward of an initial position; an outer pincers jaw mounted to each assembly; an inner pincers jaw mounted to each assembly inwardly of its associated outer pincers jaw for heightwise movement towards and away from its associated outer jaw; means mounting each of said arms for movement from an outer position to an inner position in which the jaws are in registry with said portions of the upper margin; means for initially maintaining the arms in their outer positions; means for initially maintaining each inner jaw in a raised position above its associated outer jaw; means operative to thereafter move the arms to said inner positions, said raised positions of the inner jaws precluding interference between the inner jaws and said margin portions during said inward movement of the arms; means for thereafter lowering each inner jaw against its associated outer jaw to thereby grip said margin portions; and means operative to thereafter effect said inward movement of the assemblies to thereby pull the gripped upper margin portion inwardly of the insole periphery.

17. The machine as defined in claim 16 further comprising: wiping means, mounted for movement through a wiping stroke, so as to effect said wiping of said area of the upper against the insole; and means, effective during the wiping stroke, to move the inner jaws away from the outer jaws to release the gripped margin portions.

References Cited

UNITED STATES PATENTS

| | | | |
|---|---|---|---|
| 3,008,157 | 11/1961 | Weinschenk | 12—14.5 X |
| 3,273,183 | 9/1966 | Schindler | 12—14.5 X |
| 3,404,416 | 10/1968 | Stein et al. | 12—10.5 |

PATRICK D. LAWSON, Primary Examiner

U.S. Cl. X.R.

12—14.5

UNITED STATES PATENT OFFICE
CERTIFICATE OF CORRECTION

Patent No. 3,506,992      Dated April 21, 1970

Inventor(s) Jacob S. Kamborian

It is certified that error appears in the above-identified patent and that said Letters Patent are hereby corrected as shown below:

In Figure 18 of the drawings, reference number "342" should be --242--.
    Column 4: line 23, change "84" to --86--.
    Column 6: lines 64 and 68, delete "toe".
    Column 7: line 41, change "78" to --76--.
    Column 13: line 14, change "and" to --an--.

SIGNED AND SEALED
DEC 15 1970

(SEAL)
Attest:

Edward M. Fletcher, Jr.
Attesting Officer

WILLIAM E. SCHUYLER, JR.
Commissioner of Patents